US009644786B2

(12) United States Patent
Steiner

(10) Patent No.: US 9,644,786 B2
(45) Date of Patent: May 9, 2017

(54) PNEUMATIC DOUBLE ACTUATING CYLINDER HAVING A ROTATABLY MOUNTED FEEDING TRAY

(71) Applicant: Christine E. Steiner, Plant City, FL (US)

(72) Inventor: Christine E. Steiner, Plant City, FL (US)

( * ) Notice: Subject to any disclaimer, the term of this patent is extended or adjusted under 35 U.S.C. 154(b) by 231 days.

(21) Appl. No.: 14/714,385

(22) Filed: May 18, 2015

(65) Prior Publication Data
US 2016/0341354 A1 Nov. 24, 2016

(51) Int. Cl.
*A01K 5/02* (2006.01)
*F16M 11/28* (2006.01)
*A01K 5/01* (2006.01)

(52) U.S. Cl.
CPC ........... *F16M 11/28* (2013.01); *A01K 5/0114* (2013.01)

(58) Field of Classification Search
CPC ........ F16M 11/32; A01K 5/0114; A01K 5/02; A01K 5/0291
USPC ................................ 119/61.56, 61.57, 51.01
See application file for complete search history.

(56) References Cited

U.S. PATENT DOCUMENTS

| 4,659,072 A * | 4/1987 | De La Rosa | D04B 37/00 269/17 |
| 5,000,124 A * | 3/1991 | Bergen | A01K 5/0114 119/63 |
| 5,584,263 A * | 12/1996 | Sexton | A01K 5/0114 119/51.5 |
| 5,749,316 A * | 5/1998 | Deagan | A01K 5/02 119/57.8 |
| 7,318,391 B2 * | 1/2008 | Brillon | A01K 5/0114 119/51.5 |
| 8,776,725 B1 * | 7/2014 | Grijalva | A01K 5/0114 119/51.01 |
| 9,144,225 B1 * | 9/2015 | Gaccione | A01K 5/0114 |
| 2010/0162960 A1 * | 7/2010 | Moon | A01K 29/00 119/51.02 |
| 2011/0243699 A1 * | 10/2011 | Kleeberger | B66F 9/07545 414/639 |

(Continued)

FOREIGN PATENT DOCUMENTS

JP WO 2013030997 A1 * 3/2013 ............. F16M 11/32

*Primary Examiner* — Joshua Huson
*Assistant Examiner* — Magdalena Topolski
(74) *Attorney, Agent, or Firm* — Inventions International Inc.; Tiffany C. Miller

(57) ABSTRACT

A pet feeder has a pneumatic lifting system with a rotatably mounted feeding tray. A support structure has an end connected to a surface of a feeding tray located opposite another end connected to a retaining structure. A capturing structure is connected to a cylinder. The capturing structure has an upper capturing portion having a primary opening located opposite a lower capturing portion having a secondary opening. The upper capturing portion has a primary retaining lip and the lower capturing portion has a secondary retaining lip forming a track. The retaining structure is retained within the capturing structure. The retaining structure is configured to travel along the track of the capturing structure and to rotate the tray around the perimeter of the cylinder. The pet feeder can have audio capabilities, a programmable timer, a feeding alert system, and a removable tray.

19 Claims, 9 Drawing Sheets

(56) References Cited

U.S. PATENT DOCUMENTS

| | | | |
|---|---|---|---|
| 2012/0256069 A1* | 10/2012 | Fallows | F16M 11/046 248/295.11 |
| 2013/0112146 A1* | 5/2013 | Johnson | A01K 5/00 119/51.5 |
| 2014/0318007 A1* | 10/2014 | Hogan | F16M 11/18 47/39 |
| 2015/0040832 A1* | 2/2015 | Klein | A01K 5/0291 119/51.11 |
| 2016/0316715 A1* | 11/2016 | Diamond | F16M 11/24 |
| 2016/0325586 A1* | 11/2016 | Mathieson | B60B 29/002 |

* cited by examiner

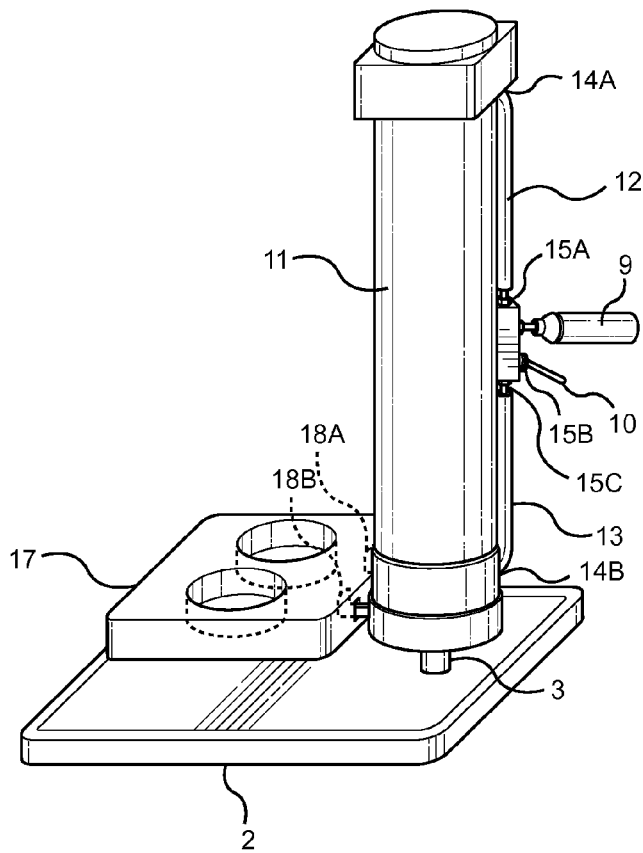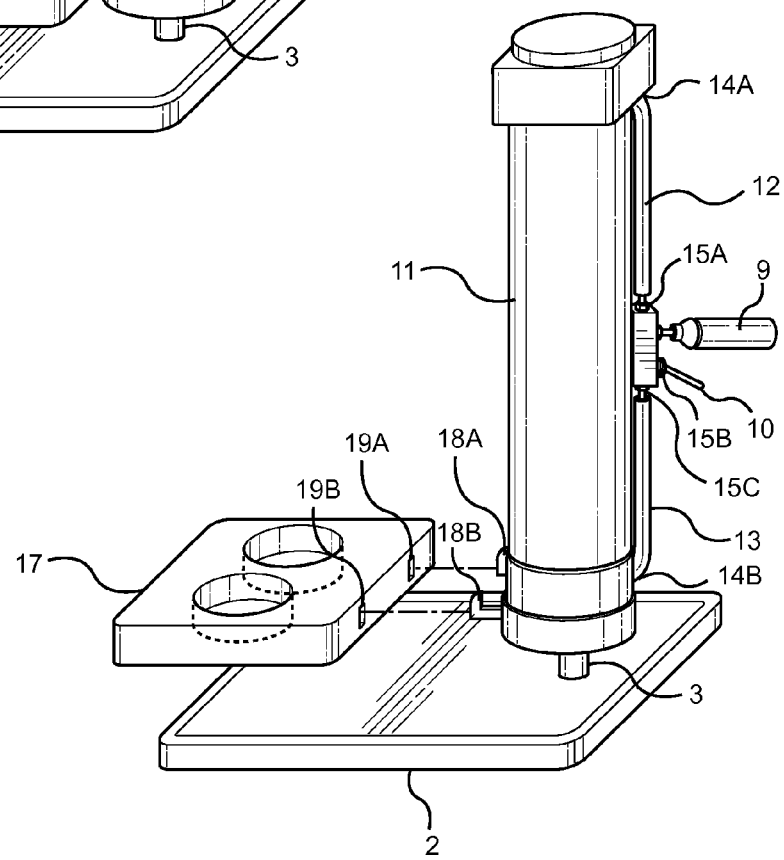

PNEUMATIC DOUBLE ACTUATING CYLINDER HAVING A ROTATABLY MOUNTED FEEDING TRAY

BACKGROUND OF THE INVENTION

1. Field of the Invention

The present invention relates, generally, to a pet tray configured to be raised and lowered. More particularly, it relates to a pneumatic double linear actuator configured to raise and lower a rotatably mounted feeding tray.

2. Background Art

Many pet feeders are maintained for cleaning purposes and are replenished with food and water by requiring a user to bend over to access a feeding tray at ground level. The problem with a user bending over is that some users such as the elderly, handicapped, wheel chair bound, surgery patients, or injured individuals do not have the ability to or may find it difficult to bend over to access their pet's food and water tray. Thus, there is a need for a user to access a pet food tray without requiring the user to bend over.

Some prior art pet feeders have a removable handle configured to have an end that connects to the pet feeding tray and another end configured for a user to grasp a handle. A user can grasp the handle portion and lift upwards to raise the feeding tray off the ground. A user is required to connect a portion of the handle to the feeding tray which requires the handle to be accurately positioned within a small opening of the tray. This may pose as a problem for a user that has limited movement or is visually impaired. Further, a user is required to manually lift the tray with the handle. This may be difficult for a user to achieve especially if a user is elderly or suffers from an injury preventing them from lifting. Thus, there is a need for a pneumatic lifting device configured to raise and lower a feeding tray, thereby, eliminating the need for a user to manually lift the pet feeder and eliminating the possibility of a user injuring themselves from manually lifting the pet feeder.

Currently, some pet feeders are configured to be vertically raised and lowered by an electric motor. An electric motor requires the use of a substantial amount of current. Some pet feeders are powered by batteries. The operating lifespan of a battery powered lift is limited to the battery life. The batteries require replacement which can be impractical and costly. Thus, there is a need for a pet feeder having a pneumatic lifting system to eliminate the need for a motor or for batteries.

Additionally, the problem with a pet feeder that is raised and lowered on a lifting device is the restriction of a user's access to the feeding tray. It would be more desirable for a feeding tray to be configured to rotate around the y-axis of the lifting device so that a user can access the feeding tray from a plurality of locations around the lifting device.

However, in view of the prior art considered as a whole at the time the present invention was made, it was not obvious to those of ordinary skill in the pertinent art how the identified needs could be fulfilled.

SUMMARY OF THE INVENTION

The long-standing but heretofore unfulfilled need for a pet feeder having a pneumatic lifting system with a rotatably mounted feeding tray that is configured to rotate around the perimeter of the pneumatic cylinder. The pet feeder has audio capabilities, a timer and feeding alert system, and a removable tray which also includes improvements that overcome the limitations of prior art pet feeders, is now met by a new, useful, and non-obvious invention.

In a preferred embodiment, the pet tray lift device has a pneumatic double actuating cylinder having an extending ram shaft. The extending ram shaft has a primary end connected to a piston located opposite a secondary end connected to a base. The pneumatic double actuating cylinder has a primary opening and a secondary opening. A pneumatic switch has at least three ports. A compressed gas reservoir is configured to connect to a primary port of the pneumatic switch. A primary tube has an end configured to connect to a secondary port of the pneumatic switch and another end of the primary tube is configured to connect to the primary opening of the pneumatic double actuating cylinder. A secondary tube has an end configured to connect to a tertiary port of the pneumatic switch and another end of the secondary tube is configured to connect to the secondary opening of the pneumatic double actuating cylinder. A tray is configured to connect to a portion of the pneumatic double actuating cylinder.

In an alternate embodiment, the base can have at least three wheels. The wheels are configured for the pet lift device to be portable and easily movable.

In an alternate embodiment, the tray is configured to be removable from the pneumatic double actuating cylinder. The tray has at least one attaching element configured to connect to a surface of the pneumatic double actuating cylinder.

In another embodiment, the tray is configured to be removable from the pneumatic double actuating cylinder. The pneumatic double actuating cylinder has at least one attaching element configured to connect to a surface of the tray.

In another embodiment, the tray has at least one opening. The tray is configured to be removable from the pneumatic double actuating cylinder. The pneumatic double actuating cylinder has at least one attaching element configured to connect to an inner wall surface of the at least one opening of the tray.

In yet another embodiment, the tray has at least one opening bordering a compartment. The compartment is configured to receive at least one item.

In another embodiment, the pneumatic double actuating cylinder has a capturing structure having an upper capturing portion having a primary opening located opposite a lower capturing portion having a secondary opening. The pneumatic double actuating cylinder is configured to connect to an inner wall surface of the capturing structure when a portion of the pneumatic double actuating cylinder is inserted through both of the primary opening of the upper capturing structure and the secondary opening of the lower capturing portion. The upper capturing portion has a primary retaining lip and the lower capturing portion has a secondary retaining lip forming a track. The capturing structure is configured to retain a retaining structure of the tray. The retaining structure is configured to slidably traverse the track. The tray has a support structure having a primary end located opposite a secondary end. The primary end of the support structure is connected to the tray. The secondary end of the support structure is connected to the retaining structure.

In another embodiment, the pneumatic double actuating cylinder has an integrally formed capturing structure. The pneumatic double actuating cylinder can have a tapered end. The tapered end of the pneumatic double actuating cylinder is configured to connect to an inner wall surface of the capturing structure when the tapered end is inserted through an opening of the capturing structure.

In another embodiment, the pet tray lift device has a programmable timer. The pet tray lift device can have a programmable alarm system.

BRIEF DESCRIPTION OF THE DRAWINGS

For a fuller understanding of the nature and objects of the invention, reference should be made to the following detailed description, taken in connection with the accompanying drawings, in which:

FIG. 5 is a side perspective view of the novel pet feeder having a pneumatic linear actuating lift having a removable feeding tray configured to be connected to at least one attaching element located on a surface of the pneumatic cylinder;

FIG. 6 is a side exploded view of the novel pet feeder having a pneumatic linear actuating lift having a removable feeding tray configured to be connected to at least one attaching element located on a surface of the pneumatic cylinder;

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
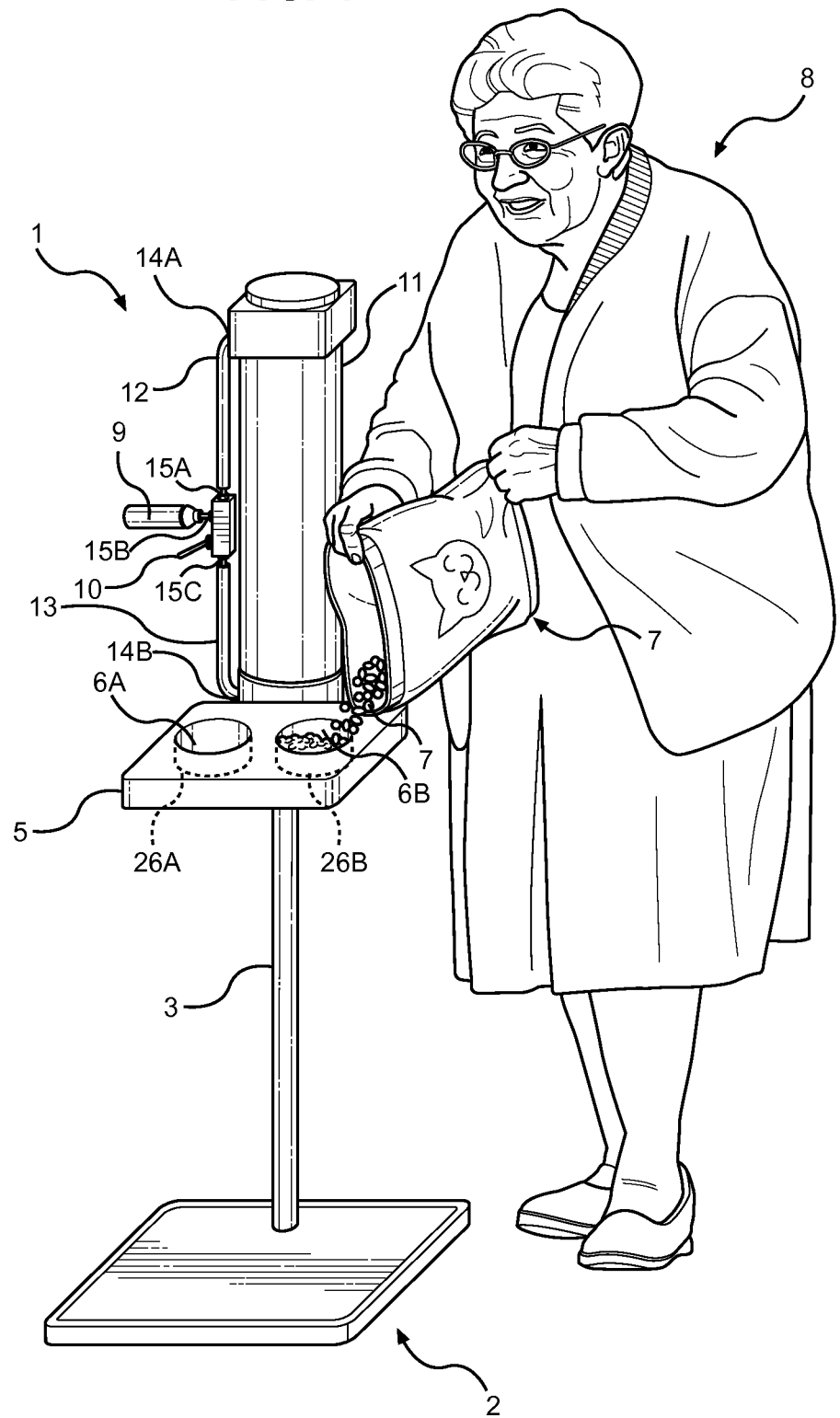
FIG. 1 is a front perspective view of the novel pet feeder having a pneumatic linear actuating lift orienting a feeding tray in an upper configuration.
Figure 2:
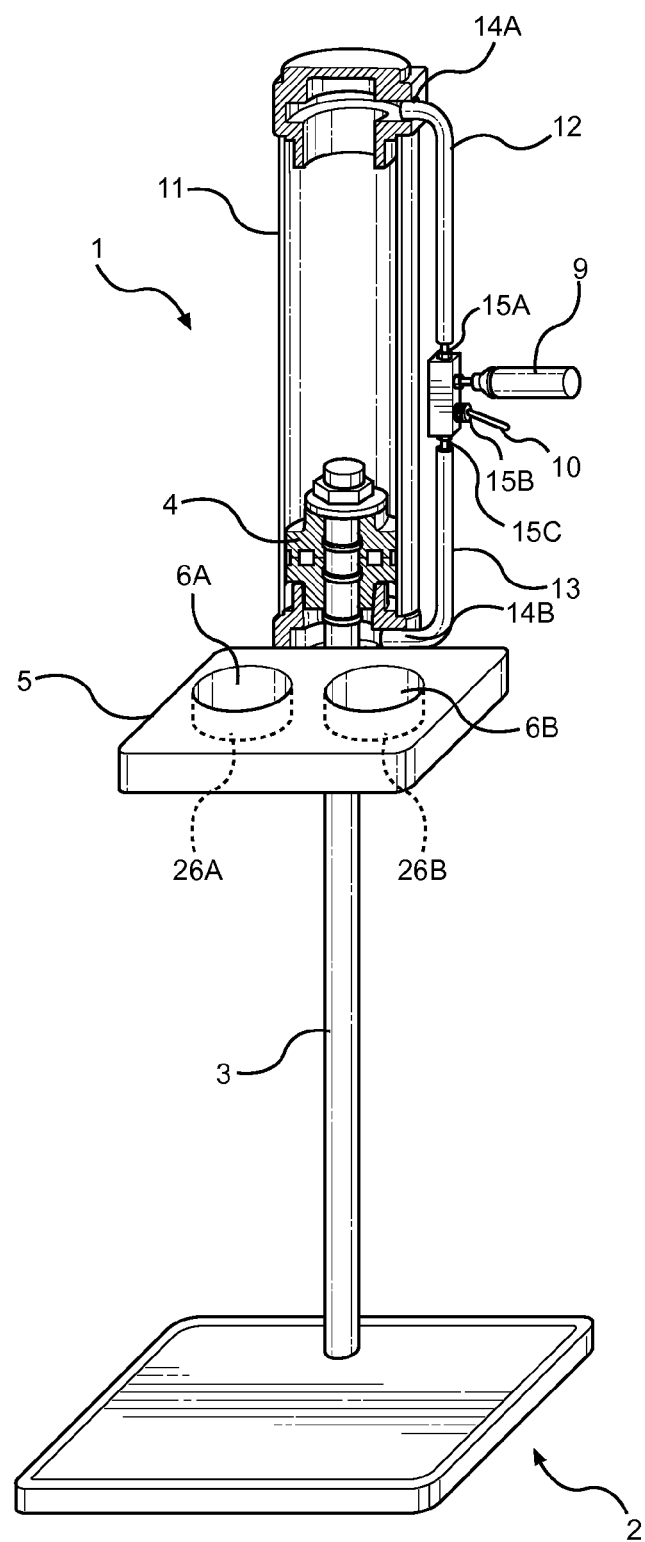
FIG. 2 is a front cut away view of the novel pet feeder having a pneumatic linear actuating lift orienting a feeding tray in an upper configuration.
Figure 3:
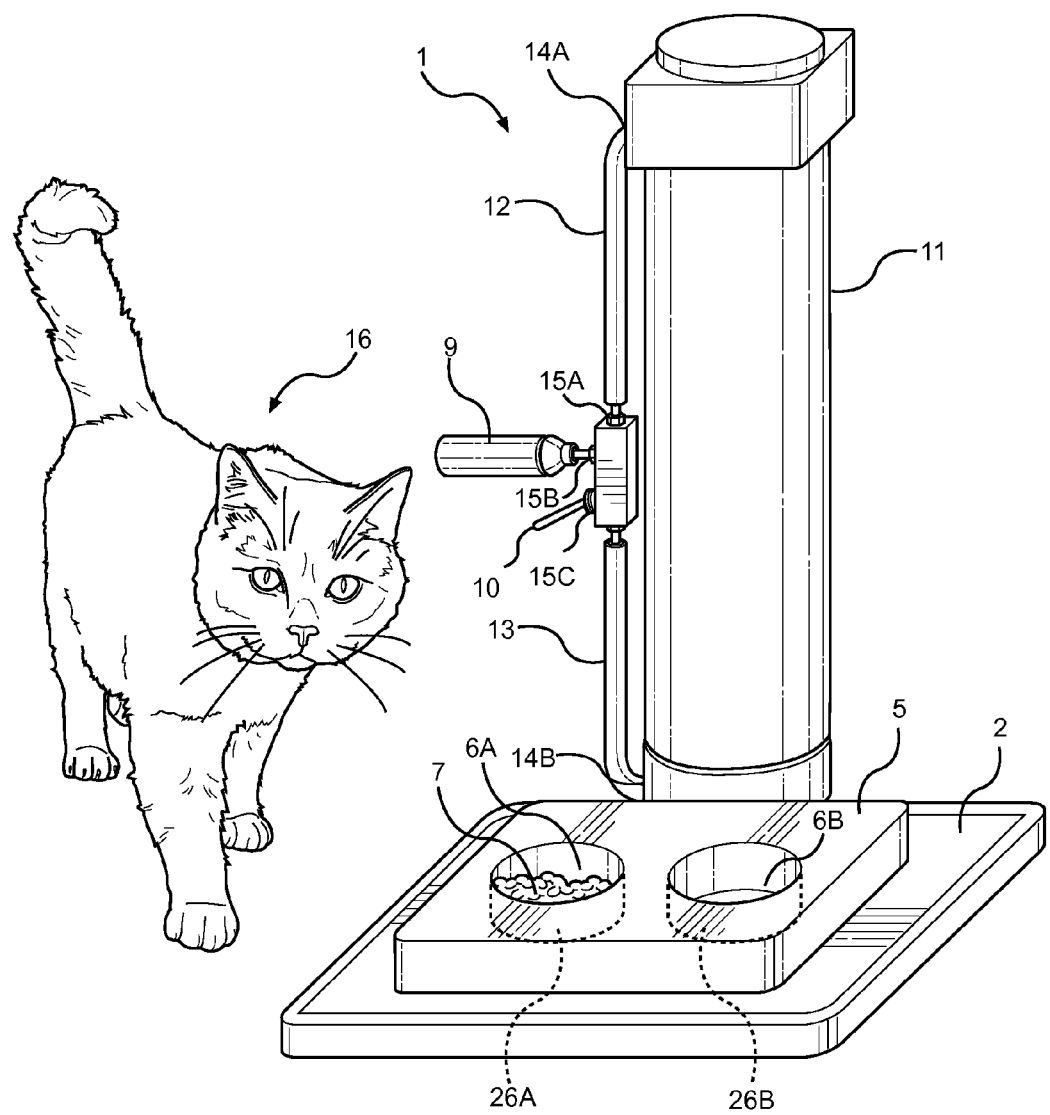
FIG. 3 is a front perspective view of the novel pet feeder having a pneumatic linear actuating lift orienting the feeding tray in a lower configuration.
Figure 4:
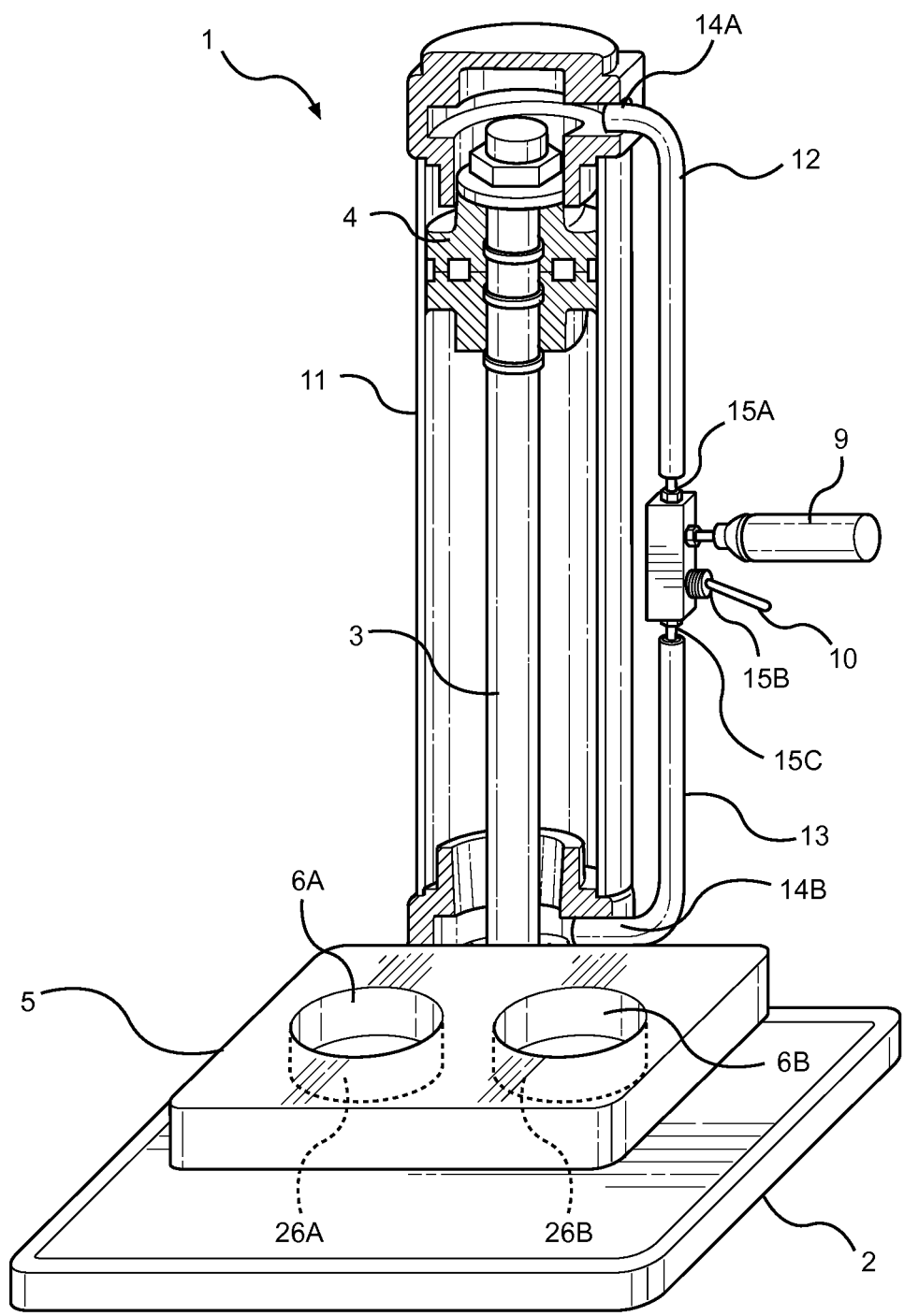
FIG. 4 is a front cut away view of the novel pet feeder having a pneumatic linear actuating lift orienting the feeding tray in a lower configuration.

In a preferred embodiment, FIGS. 1-4 illustrate pet feeder lift system 1 having pneumatic double actuating cylinder 11 with extending ram shaft 3 (FIGS. 1, 2, and 4). Ram shaft 3 has an end connected to base 2 located opposite another end connected to piston 4 (FIGS. 2 and 4). Tray 5 is connected to a portion of pneumatic double actuating cylinder 11. Tray 5 has tray opening 6A and tray opening 6B. Tray opening 6A can border compartment 26A and tray opening 6B can boarder compartment 26B. Compartment 26A and compartment 26B are configured to receive an item by user 8 (FIG. 1) or by a machine (not shown). A machine may include, but not be limited to, an automatic feeder or an automatic dispenser. An item includes, but is not limited to, dinnerware, food 7, a liquid, pet treats, medicine, or water.

FIGS. 1-7 depict pet feeder lift system 1 having pneumatic switch 10 having primary switch port 15A, secondary switch port 15B, and tertiary switch port 15C. Pneumatic double actuating cylinder 11 has primary cylinder port 14A and secondary cylinder port 14B. Primary switch port 15A is configured to connect to an end of primary tube 12. The other end of primary tube 12 is configured to connect to cylinder port 14A. Secondary switch port 15B is configured to connect compressed gas reservoir 9 to pneumatic switch 10. Tertiary switch port 15C is configured to connect to an end of secondary tube 13. The other end of secondary tube 13 is configured to connect to secondary cylinder port 14B.

FIGS. 5 and 6 show removable tray 17 configured to be connected to pneumatic double actuating cylinder 11. Removable tray 17 has opening 19A and opening 19B. Latching structure 18A and latching structure 18B are connected to a portion of pneumatic double actuating cylinder 11. Latching structures 18A and 18B of cylinder 11 are configured to be inserted into openings 19A and 19B of removable tray 17 to retain removable tray 17.

FIGS. 7-12 illustrate pneumatic double actuating cylinder 11 having rotatable tray 20. Support structure 22 has an end connected to removable tray 20 located opposite another end connected to retaining structure 23. Capturing structure 27 is connected to a portion of cylinder 11 (FIGS. 7 and 9-12). It is within the scope of this invention for capturing structure 27 to be integrally formed within cylinder 11. It is also within the scope of thins invention for capturing structure 27 to be connected to an end of cylinder 11.

Figure 9:
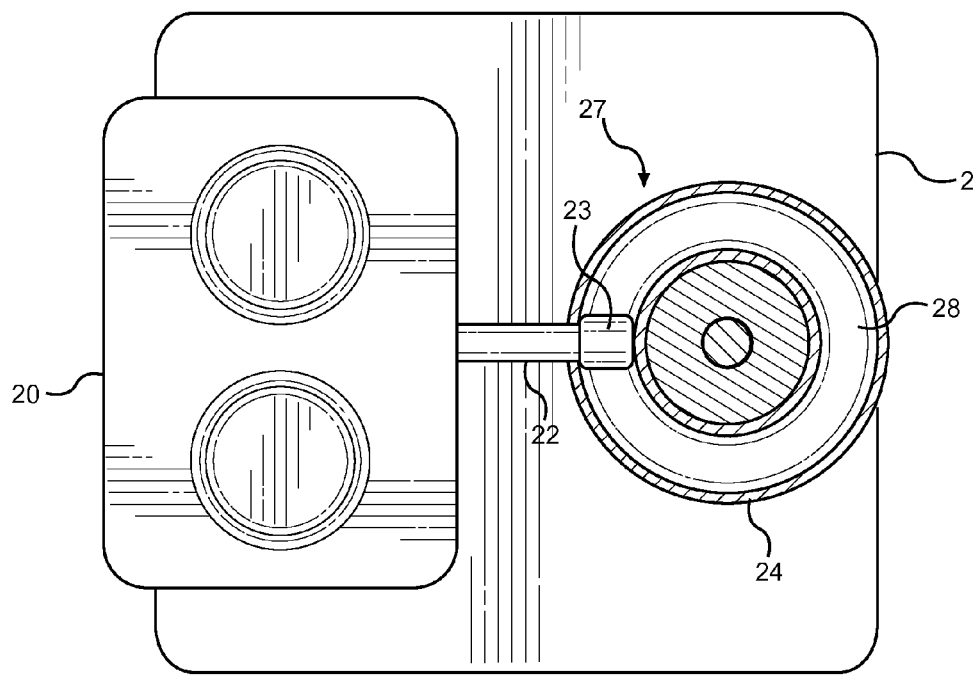
FIG. 9 is a top view of the novel capturing structure retaining a retaining structure configured to traverse along a track.
Figure 10:
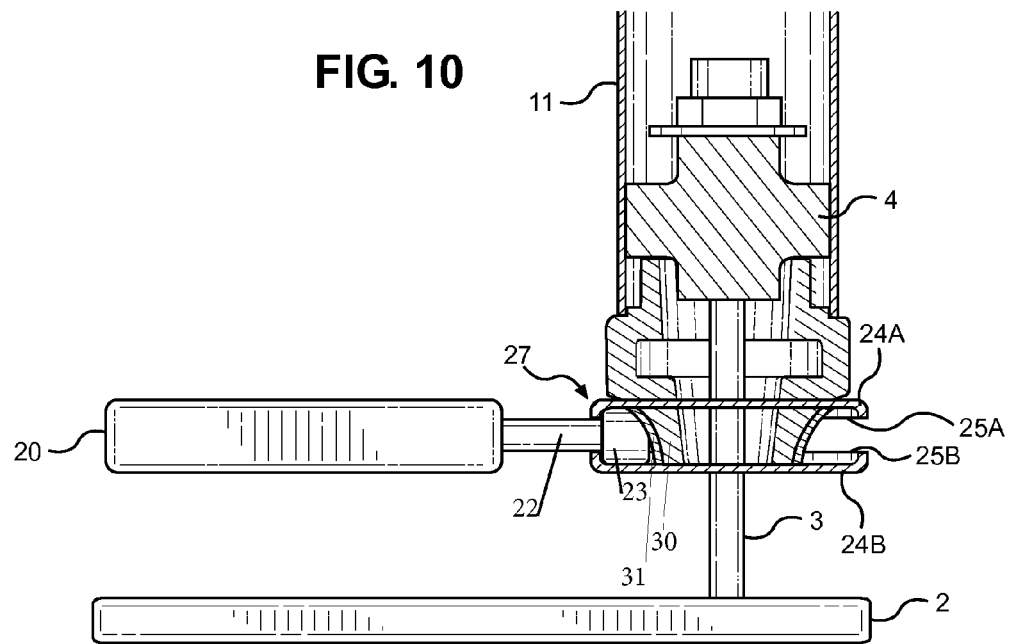
FIG. 10 is a side cut away perspective view of the novel capturing structure retaining a retaining structure.
Figure 11:
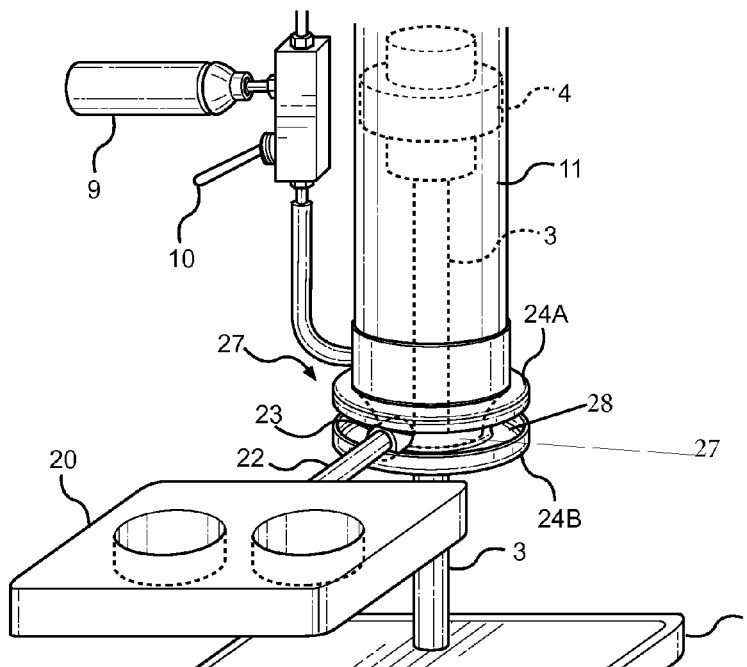
FIG. 11 is a perspective view of the novel capturing structure retaining a retaining structure; and, FIG. 12 is an exploded view of the novel capturing structure configured to connect to an outer perimeter of the pneumatic double acting cylinder.

Capturing structure 27 has upper capturing portion 24A having opening 29A positioned over lower capturing portion 24B having opening 29B (FIG. 12), thereby, retaining the retaining structure 23 within capturing structure 27 and allowing for rotational movement of retaining structure 23 along track 28 (FIGS. 9 and 10). Upper capturing portion 24A has retaining lip 25A and lower capturing portion 24B has retaining lip 25B forming track 28. Track 28 can be positioned over the outer perimeter of cylinder 11 and allows retaining structure 23 to slidably traverse track 28.

Figure 12:
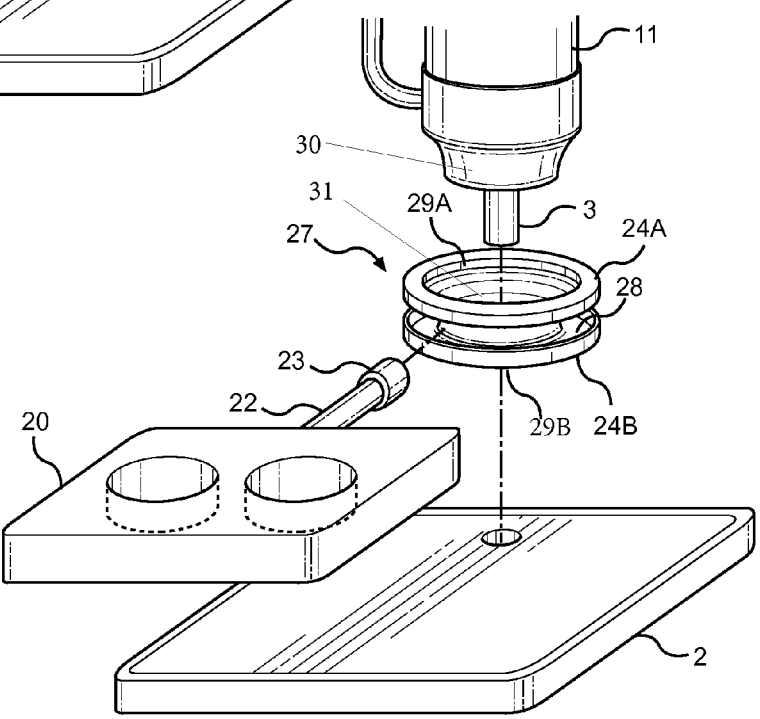

FIGS. 10 and 12 illustrate pneumatic actuating cylinder 11 having tapered end 30 configured to connect to an inner wall surface 31 of capturing structure 27.

Figure 7:
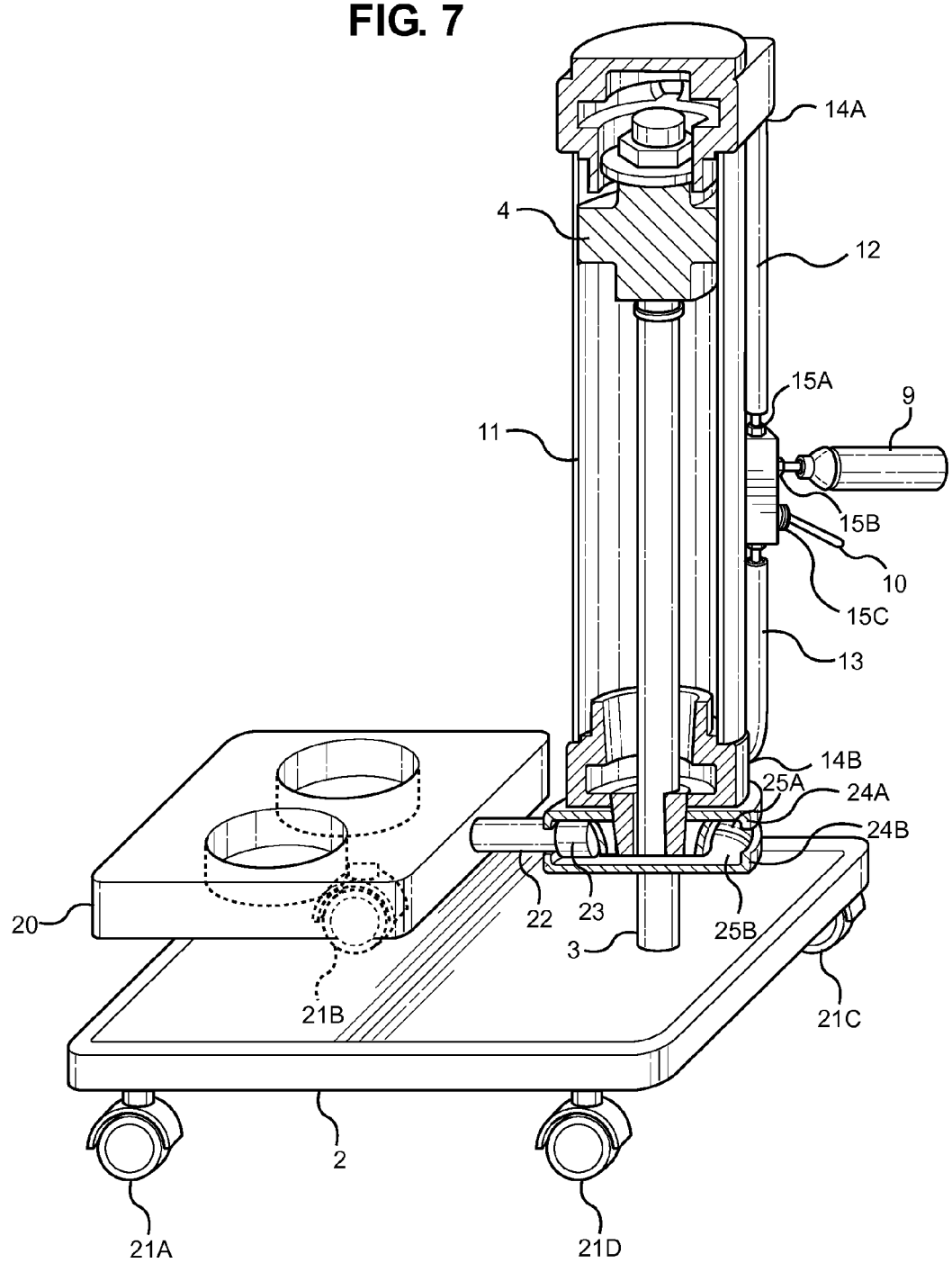
FIG. 7 is a side cut away perspective view of the novel capturing structure connected to cylinder 11 and base 2 having wheels 21A-21D.
Figure 8:
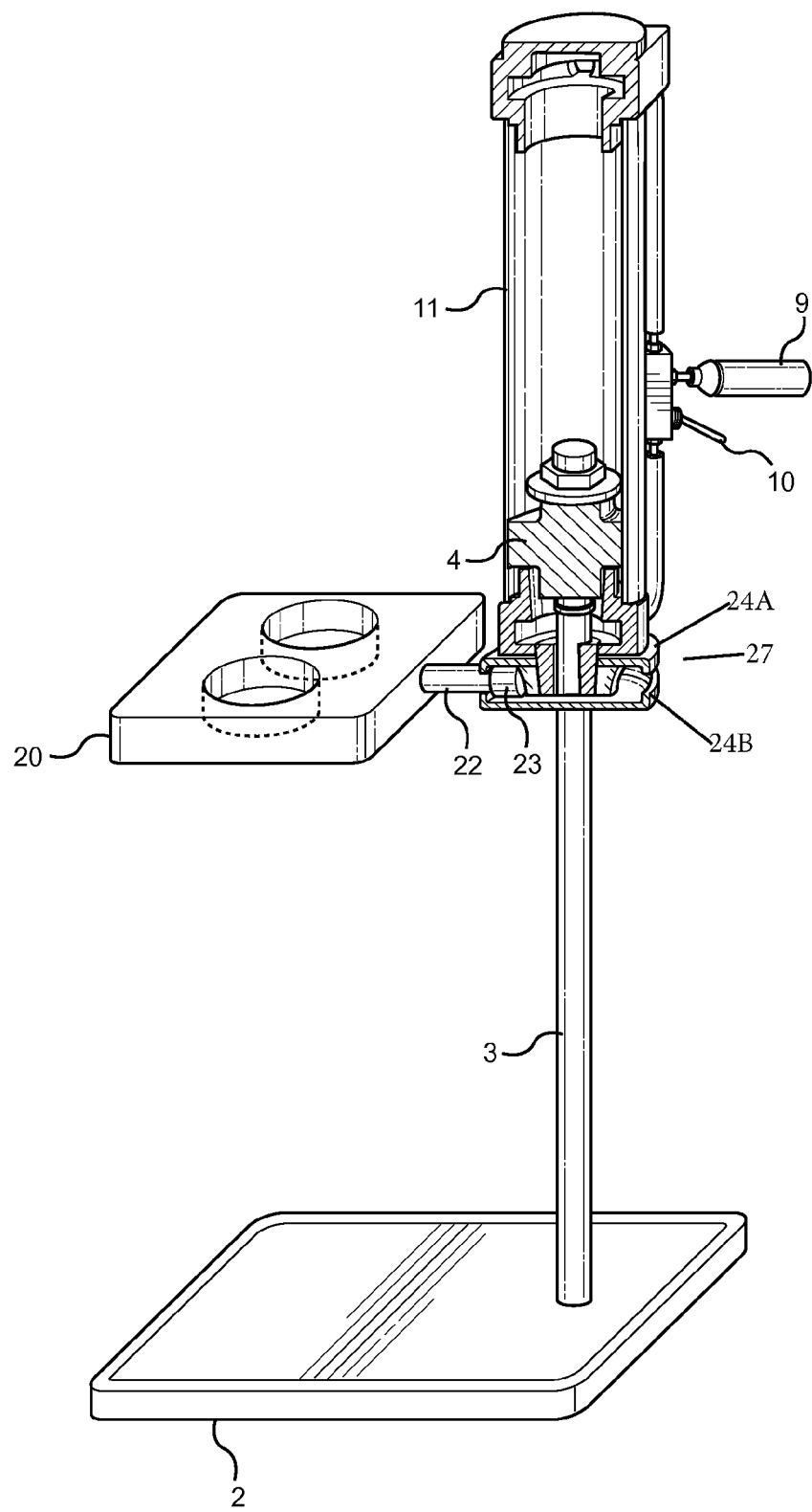
FIG. 8 is a side cut away perspective view of the novel pneumatic double acting cylinder having an integrally formed capturing structure.

An important object of this invention is to provide a portable pneumatic double actuating cylinder 11 with base 2 having wheels 21A, 21B, 21C, and 21D (FIG. 7).

Additional objects include, but are not limited to, the provision of pet feeder lift system 1 being configured to have a removable tray, to be remotely operated, to have audio capabilities, to have a food and water dispenser, to have a programmable timer, to have a programmable alert system, to have wheels, and for the tray to be rotatable around cylinder 11.

These and other important objects, advantages, and features of the invention will become clear as this description proceeds.

The invention accordingly comprises the features of construction, combination of elements, and arrangement of parts that will be exemplified in the description set fourth hereinafter and the scope of the invention will be indicated in the claims.

Construction of the Novel Pet Feeder Lift System In a preferred embodiment, when compressed gas (not shown) from compressed gas reservoir 9 enters cylinder 11 through port 14A, cylinder 11 is oriented in an upper configuration for access to user 8. When compressed gas (not shown) from compressed gas reservoir 9 enters cylinder 11 through port 14B, cylinder 11 is oriented in a lower configuration making tray 5 accessible to animal 16 (FIG. 3). Pet feeder lift system 1 has pneumatic switch 10 configured for user 8 to manually pivot the switch 10 (FIGS. 1-8) to raise tray 5 to an upper orientation (FIGS. 1 and 2) or to lower tray 5 to a lower configuration (FIGS. 3 and 4). Compressed gas reservoir 9 is replaceable and a new compressed gas reservoir can replace an exhausted compressed gas reservoir.

It is within the scope of this invention for tray 5 to have at least one opening bordering a compartment. It is within the scope of this invention for tray 5 to have at least one compartment. The compartment can receive including, but not limited to, removable dinnerware or an item. An item includes, but is not limited to, food, a liquid, medicine, or dinnerware. It is also within the scope of this invention for tray 5 to not have any openings or compartments, whereby, a surface of tray 5 is configured to receive dinnerware including, but not limited to, a dish, a plate, a bowl, a pet food tray, a food serving dish, or a cup. In another embodiment, at least one opening is configured to receive removable dinnerware. In another embodiment, a plurality of openings such as tray opening 6A and tray opening 6B, are configured to receive removable dinnerware (not shown).

In another embodiment as shown in FIGS. 5 and 6, removable tray 17 can connect to cylinder 11. Removable tray 17 can connect to cylinder 11 with at least one attaching element including, but not limited to, a latch, a magnet, a snap, a fastener, or a clamp. Tray 17 is configured to be removable from cylinder 11 by user 8.

In another embodiment, tray 20 can be rotatably mounted to cylinder 11. Tray 20 is configured to be rotated by a user. It is within the scope of this invention for capturing structure to have a locking mechanism (not shown) that prevents retaining structure 23 from traversing track 28 when an animal is eating or drinking from tray 20. A detent (not shown) may connect to capturing structure 27 to resist the rotation of retaining structure 23 along track 28. In another embodiment, base 2 can have a retaining structure to prevent tray 20 from sliding off base 2 when an animal is eating or drinking from tray 20. It is within the scope of this invention for retaining structure being any shape including, but not limited to, a circle or a square.

In another embodiment, a programmable alert system (not shown) and timer (not shown) can be connected to pet feeder lift system 1. Data including, but not limited to, pet feeding times or medicine dispensing times can be programmed into the alert system by a programmer including, but not limited to a user or by a machine. It is within the scope of this invention for an alert system to notify a user during a programmed time with including, but not limited to, a pre-recorded voice recording, a sound, a flashing light, or a series of flashing lights.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

The invention claimed is:

1. A pet tray lift device, comprising:
   a pneumatic double actuating cylinder having an extending ram shaft, said extending ram shaft having a first end connected to a piston located opposite a secondary end connected to a base;
   said pneumatic double actuating cylinder having a first opening and a second opening;
   a pneumatic switch having at least three ports;
   a compressed gas reservoir, said compressed gas reservoir is configured to connect to a first port of said pneumatic switch;
   a first tube, said first tube having an end configured to connect to a second port of said pneumatic switch and another end of said first tube is configured to connect to said first opening of said pneumatic double actuating cylinder;
   a second tube, said second tube having an end configured to connect to a third port of said pneumatic switch and another end of said second tube is configured to connect to said second opening of said pneumatic double actuating cylinder; and,
   a tray, said tray configured to connect to a portion of said pneumatic double actuating cylinder said tray having a compartment configured to hold a pet food item.

2. The pet tray lift device of claim 1, wherein said pet tray lift device having a programmable alarm system.

3. The pet tray lift device of claim 1, wherein said pet tray lift device having a programmable timer.

4. The pet tray lift device of claim 1, wherein said pneumatic double actuating cylinder having a capturing structure, said capturing structure comprising an upper capturing portion having a first opening located opposite a lower capturing portion having a second opening, said pneumatic double actuating cylinder is configured to connect to an inner wall surface of said capturing structure when a portion of said pneumatic double actuating cylinder is inserted through both of said first opening of said upper capturing portion and said second opening of said lower capturing portion, said upper capturing portion having a first retaining lip and said lower capturing portion having a second retaining lip forming a track, whereby, said capturing structure is configured to retain a retaining structure of said tray, whereby, said retaining structure is configured to slidably traverse said track.

5. The pet tray lift device of claim 4, wherein said tray having a support structure having a first end located opposite a second end, said first end of said support structure is connected to said tray, said second end of said support structure is connected to said retaining structure.

6. The pet tray lift device of claim 1, wherein said pneumatic double actuating cylinder having an integrally formed capturing structure.

7. The pet tray lift device of claim 1, wherein said pneumatic double actuating cylinder having a tapered end.

8. The pet tray lift device of claim 7, wherein said tapered end of said pneumatic double actuating cylinder is configured to connect to an inner wall surface of a capturing structure when said tapered end is inserted through an opening of said capturing structure.

9. The pet tray lift device of claim 1, wherein said base having at least three wheels.

10. The pet tray lift device of claim 1, wherein said tray is configured to be removable from said pneumatic double actuating cylinder, whereby said tray having at least one attaching element configured to connect to a surface of said pneumatic double actuating cylinder.

11. The pet tray lift device of claim 1, wherein said tray is configured to be removable from said pneumatic double actuating cylinder, whereby said pneumatic double actuating cylinder having at least one attaching element, said at least one attaching element configured to connect to a surface of said tray.

12. The pet tray lift device of claim 1, wherein said tray having at least one opening, said tray is configured to be removable from said pneumatic double actuating cylinder, whereby, said pneumatic double actuating cylinder having at least one attaching element, said at least one attaching element is configured to connect to an inner wall surface of said at least one opening of said tray.

13. The pet tray lift device of claim 1, wherein said tray is rotatably mounted to said pneumatic double actuating cylinder, said tray having a support structure having a first end located opposite a second end, said first end of said support structure is connected to said tray, said second end of said support structure is connected to a retaining structure, said retaining structure is configured to connect to a track on said pneumatic double actuating cylinder.

14. A pet tray lift device, comprising:
  a pneumatic double actuating cylinder having an extending ram shaft, said extending ram shaft having a first end connected to a piston located opposite a secondary end connected to a base;
  said pneumatic double actuating cylinder having a first opening and a second opening;
  a pneumatic switch having at least three ports;
  a compressed gas reservoir, said compressed gas reservoir configured to connect to a first port of said pneumatic switch;
  a first tube, said first tube having an end configured to connect to a second port of said pneumatic switch and another end of said first tube is configured to connect to said first opening of said pneumatic double actuating cylinder;
  a second tube, said second tube having an end configured to connect to a third port of said pneumatic switch and another end of said second tube is configured to connect to said second opening of said pneumatic double actuating cylinder; and,
  a removable tray, said removable tray is configured to connect to a portion of said pneumatic double actuating cylinder, said removable tray having at least one opening, said removable tray is configured to be removable from said pneumatic double actuating cylinder, whereby said pneumatic double actuating cylinder having at least one attaching element, said at least one attaching element is configured to connect to an inner wall surface of said at least one opening of said removable tray said tray having a compartment configured to hold a pet food item.

15. The pet tray lift device of claim 14, wherein said pet tray lift device having a programmable alarm system.

16. The pet tray lift device of claim 14, wherein said pet tray lift device having a programmable timer.

17. A pet tray lift device, comprising:
  a pneumatic double actuating cylinder having an extending ram shaft, said extending ram shaft having a first end connected to a piston located opposite a secondary end connected to a base;
  said pneumatic double actuating cylinder having a first opening and a second opening;
  a pneumatic switch having at least three ports;
  a compressed gas reservoir, said compressed gas reservoir configured to connect to a first port of said pneumatic switch;
  a first tube, said first tube having an end configured to connect to a second port of said pneumatic switch and another end of said first tube is configured to connect to said first opening of said pneumatic double actuating cylinder;
  a second tube, said second tube having an end configured to connect to a third port of said pneumatic switch and another end of said second tube is configured to connect to said second opening of said pneumatic double actuating cylinder;
  a tray, said tray having a support structure having a first end located opposite a second end, said first end of said support structure is connected to said tray, said second end of said support structure is connected to a retaining structure; and,
  a capturing structure, said capturing structure is configured to connect to an outer perimeter of said pneumatic double actuating cylinder, said capturing structure comprising an upper capturing portion having a first opening located opposite a lower capturing portion having a second opening, said upper capturing portion having a first retaining lip and said lower capturing portion having a second retaining lip forming a track, whereby, said capturing structure is configured to retain said retaining structure of said tray, whereby, said retaining structure is configured to slidably traverse said track said tray having a compartment configured to hold a pet food item.

18. The pet tray lift device of claim 17, wherein said pet tray lift device having a programmable alert system.

19. The pet tray lift device of claim 17, wherein said pet tray lift device having a programmable timer.

\* \* \* \* \*